United States Patent
Kazakis et al.

[11] Patent Number: 5,901,464
[45] Date of Patent: May 11, 1999

[54] E-1 TWIN TOWER AIR DRYER FOR AN AIR COMPRESSOR UNIT

[75] Inventors: Michael V. Kazakis, Simpsonville, S.C.; Scott M. Trapp, Charlotte, N.C.; T. Kevin Castle, Wellford, S.C.

[73] Assignee: Westinghouse Air Brake Company, Wilmerding, Pa.

[21] Appl. No.: 08/979,649

[22] Filed: Nov. 26, 1997

[51] Int. Cl.$^6$ .................................................. F26B 19/00
[52] U.S. Cl. .................................. 34/562; 34/566; 34/80
[58] Field of Search ................................. 34/562, 566, 80; 55/137, 337, 416, 426, 432; 96/134, 137, 209, 416

[56] References Cited

U.S. PATENT DOCUMENTS

| | | | |
|---|---|---|---|
| 3,592,563 | 7/1971 | Glass et al. | 137/596.2 X |
| 3,877,904 | 4/1975 | Lowrie | 55/426 X |
| 4,149,861 | 4/1979 | Sogo et al. | 55/426 X |
| 4,247,311 | 1/1981 | Seibert et al. | 96/111 |
| 4,525,183 | 6/1985 | Cordes et al. | 137/543.15 |
| 4,853,010 | 8/1989 | Spence et al. | 55/426 X |
| 5,604,991 | 2/1997 | Castle et al. | 34/80 |
| 5,662,727 | 9/1997 | Castle et al. | 34/80 X |
| 5,685,896 | 11/1997 | Castle et al. | 34/80 X |

Primary Examiner—Henry Bennett
Assistant Examiner—Steve Gravini
Attorney, Agent, or Firm—James Ray & Associates

[57] ABSTRACT

A twin tower air drying system for cleaning and drying a stream of unpurified pressurized air including a centrifugal separator having a baffle horizontally disposed therein to generally separate the centrifugal chamber into an upper sub-chamber and a lower sub-chamber; a pair of cavities each containing desiccant media and a purge tube with a flapper valve thereover to close and restrict flow of air through the purge tube when air is flowing upwardly through the cavity, and to open and promote air flow through the purge tube when air is flowing downwardly through the cavity; a pair of two-way control valves to either deliver a stream of air from the centrifugal separator to a cavity or to open a cavity to atmosphere; a timer control for alternately and periodically altering the condition of the two-way control valves such that when one is delivering air to a cavity, the other is open to atmosphere; a shuttle valve for admitting an output percentage of air emerging from either of the cavities to a storage chamber, and to by-pass a purge percentage of the air into the other cavity from which air is not emerging.

18 Claims, 3 Drawing Sheets

E-1 TWIN TOWER AIR DRYER FOR AN AIR COMPRESSOR UNIT

CROSS REFERENCE TO RELATED APPLICATIONS

The invention taught in this patent application is closely related to the inventions taught in U.S. Pat. No. 5,423,129, and to pending patent application Ser. Nos. 08/597,262 and 08/597,261 both filed Feb. 6, 1996, and respectively titled "Switching and Purging Mechanism For A Twin Tower Air Dryer", and "Linear Choke Shuttle/Office Check Valve Mechanism For A Twin Tower Air Dryer"; and is further closely related to the following co-pending patent applications: "E-1 Air Dryer Liquid Separator With Baffle", Ser. No. 08/978,796; "Control Valve With Axial Sealing", Ser. No. 08/978,551; "Shuttle Valve Mechanism For Twin Tower Air Dryer", Ser. No. 08/979,198; "Purge Tube With Flapper Valve For Desiccant Containing Air Dryer", Ser. No. 08/979,197; all of which are being filed concurrently herewith. All of the above-referenced patent and patent applications are assigned to the assignee of this invention. Additionally, the teachings of each of those issued and co-pending patent applications is incorporated herein by reference thereto.

FIELD OF THE INVENTION

The present invention generally relates to a new and improved twin tower air cleaning and drying system which overcomes a number of problems encountered with a prior art twin tower system. More particularly, the present invention pertains to a new and improved twin tower air cleaning and drying system which includes a number of improved components, including a new and improved centrifugal separator, new and improved control valves, a new and improved shuttle valve mechanism and desiccant containing chambers each having a purge tube to enhance moisture removal from the desiccant media during the desiccant purge cycle, all of which in combination with each other significantly improve the system to reduce the moisture content of the filtered and dried air to exceptionally low levels.

BACKGROUND OF THE INVENTION

It will be appreciated that a Westinghouse Air Brake Company C-1 air dryer is designed to remove moisture from compressed air for use in a compressed air system as utilized on railway trains, transit vehicles and the like, as necessary to operate the air brake system and air valves. U.S. Pat. No. 5,423,129, assigned to the assignee of this invention and cited above, discloses such a system wherein the compressed air is cleaned and dried by passing it through a regenerating system containing a desiccant material to absorb the moisture and filter-out particulate matter. The desiccant is regenerated by passing a small percentage of the dried air back therethrough which absorbs at least some of the moisture collected in the desiccant and is therefore discarded.

In operation, the above noted prior art air drying system (now referred to as the "single tower" system) receives compressed air from a conventional air compressor, a supply which typically contains an unacceptably high amount of moisture and other particulates suspended therein. This unpurified compressed air is caused to flow upwardly through a desiccant material usually in the form of a porous cartridge containing a porous desiccant media. The desiccant plays the key role within the single tower air drying system in that it absorbs the moisture and traps various particulates (e.g., dust, dirt, etc.) as the compressed air moves upwardly through the desiccant media. Once moisture and particulates are extracted from the air stream, the cleaned and dried compressed air continues flowing from the desiccant media through a purge check valve situated near the top of the tower. This purified compressed air then passes through a side chamber, a part of which eventually reaches a purge volume.

When the air compressor is cycled off, the system operates in a purge mode. During the purge mode, the purified pressurized air contained within the purge volume passes slowly in the reverse direction through a choke in a purge check valve and then back through the desiccant media. This slow stream of dried air reabsorbs a portion of the moisture previously collected within the desiccant media. Having evaporated into this passing stream of dry air, the evaporated moisture eventually exhausts through the sump volume to atmosphere. This gradual purging of dry air back through the system serves to dry out and thus rejuvenate or regenerate the desiccant media. When the air compressor is again cycled on, the tower system returns to operation in a drying mode, with the desiccant media then again removing moisture from the stream of unpurified compressed air passing therethrough.

More recently, a twin tower system has been proposed and developed in which a pair of desiccant containing chambers or towers are provided, each alternating back and forth between operation in drying mode and in recycle mode. Accordingly, at any given moment of operation, one tower is operating in air drying cycle while the other is operating in recycle mode or purge cycle. A pair of control valves are provided to automatically switch the flow to reverse these flow directions so that after a defined time period the cycles are reversed so that in effect a continuous operation is achieved with each tower alternately operating in drying mode permitting moisture to collect within the desiccant media while the other tower is in recycle mode removing the collected moisture from the desiccant material or media. This unique system obviously has a greater moisture removing capability and also avoids the need to have the source of unpurified air cycled-off in order to purge the desiccant material of the moisture it has accumulated, and thereby eliminate the need to temporarily deprive the pneumatic system of a steady supply of clean and dried compressed air while the compressor is turned off.

In addition to the above advantages, the switching of the two drying assemblies alternately between the drying and the purging modes allows the twin tower system to exsiccate the air stream more efficiently than the prior art single tower system. Two desiccant towers rather than one are employed in the air drying system with one absorbing moisture while the other is being purged of it. The switching of the two drying assemblies alternately between the drying and the purging modes thus serves to continuously purge moisture from the twin tower system. More fully desiccated air is thus supplied to the pneumatic system. The amount, density and overall surface area of the desiccant can also be selected to suit varying needs.

The twin tower system can be applied to a wide variety of pneumatic systems. Typical of the types of pneumatic systems to which the twin tower system could be applied include the pneumatic brake systems of passenger and freight railroad trains, subway trains and various other types of rail related transportation systems. Further examples include the pneumatic brake systems of various truck transport vehicles. Other types of pneumatic systems to which the twin tower system could be applied may be found outside the transportation field.

Another disadvantage of the single tower air drying system is that it is only capable of removing a certain, limited amount of moisture during the purge mode. Because the volume of unpurified air flowing into the system to be dried vastly exceeds the volume of purified air used to purge the desiccant media, the desiccant media never adequately exsiccates during operation of the single tower system. Indeed, the desiccant media adequately exsiccates only after the system has been turned off for a prolonged time sufficient to accomplish same. While the prior art twin tower system has a greatly increased water removing capacity, it is still not as great as would be desired for completely trouble free operation.

SUMMARY OF THE INVENTION

This invention is predicated upon our conception and development of a new and significantly improved twin tower system for removing water or moisture from compressed air, or even from a compressed gas other than air. This new and inventive system includes a number of improved components, including a new and improved centrifugal separator, new and improved control valves, a new and improved shuttle valve mechanism and desiccant containing chambers each having a purge tube to enhance moisture removal from the desiccant media during the desiccant purge cycle, all of which in combination with each other significantly improve the system to reduce the moisture content of the cleaned and dried air to such an exceptionally low level that no condensation of moisture from the air can occur even when the temperature of the compressed air is suddenly reduced.

In essence the new system comprises a centrifugal separator for initially centrifugally separating moisture and other particulates from such stream of unpurified air, the centrifugal separator having a baffle horizontally disposed therein to generally separate the centrifugal chamber into an upper sub-chamber and a lower sub-chamber but insufficient to prevent downward flow of centrifugally collected liquid along interior walls of the centrifugal chamber, a sump for collecting the centrifugally separated liquid at the bottom of the centrifugal chamber, and a drain for periodically draining the centrifugally separated liquid from the sump.

In addition, a pair of cavities are provided each containing desiccant media, with the cavities further including a purge tube extending vertically within the desiccant media from an upper surface to a level approximately ⅔ of the distance downward. A flapper valve disposed over the desiccant media and purge tube adapted to close and restrict flow of air through the purge tube when the air is flowing upwardly through the cavity, and further adapted to open and promote air flow through the purge tube when the air is flowing downwardly through the cavity. The system further includes a pair of control valves connected to the cavities adapted to be either in an open condition or a closed condition, whereby in the open condition the control valves will deliver a stream of unpurified air from the centrifugal separator to one of the cavities, and in said closed condition will open the cavities to atmosphere. Also included is a timer control for alternately and periodically opening and closing the control valves such that as a first valve is in the opened condition a second valve is in the closed condition, with the first cavity functioning in an air filtering and drying mode with the unpurified gas passing through the desiccant media within the first cavity, and visa versa. A shuttle valve is also provided for admitting an output percentage of filtered and dried air emerging from the first cavity to a storage chamber when the first control valve is in the open condition, and alternately for admitting an output percentage of filtered and dried air emerging from the second cavity to the storage chamber when the second control valve is in the open condition, with the shuttle valve further having a by-pass means adapted to permit a purge percentage of the filtered and dried air to be admitted into the second cavity when the first valve is in the open condition, and alternately adapted to permit a purge percentage of the filtered and dried air to be admitted into the first cavity when the second valve is in the open condition.

OBJECTS OF THE INVENTION

It is, therefore, a primary object of the present invention to provide a new and improved twin tower air cleaning and drying system which is superior to the original twin tower air cleaning and drying system which is capable of reducing the moisture content to such an exceptionally low level that no condensation of moisture from the air can occur even if the temperature of the compressed air is suddenly reduced.

It is another object of this invention to provide a new and improved twin tower air cleaning and drying system which includes a new and improved centrifugal separator capable of eliminating significant moisture from the compressed air before the compressed air is introduced into the desiccant containing towers thereby achieving a more complete removal of moisture from the compressed air.

It is a further object of this invention to provide a new and improved twin tower air cleaning and drying system which includes new and improved control valves in which all seals are axially arranged about a pneumatically or electrically operated piston to achieve better sealing and minimize component wear, and which are easy to insert into and remove from mating components and provides optimum flow through any of the open valve ports, and does not expose the internal diaphragm to any back pressure thereby prolonging the life of the internal diaphragm as compared to comparable prior art valves.

It is an even further object of this invention to provide a new and improved twin tower air cleaning and drying system which includes a new design for the desiccant containing towers by including a purge tube within each tower adapted to admit the recycle dried air into the desiccant media at a location where the moisture content is the greatest, with the purge tube provided with a one-way valve means adapted to close and restrict flow of air through the purge tube when the air is flowing in the air drying cycle and to open and promote air flow through the purge tube when the air is flowing in the desiccant purge cycle.

It is still another object of this invention to provide a new and improved twin tower air cleaning and drying system which includes a new design for the shuttle valve mechanism which is a low-velocity, short stroke, reciprocating shuttle valve of a comparatively large size to compliment its ease of installation and removal, and in which its moving components are centralized with its main recesses converging near the geometric center of the valve body to centralize the reciprocating shuttle valve when shifting from one side to the other so that the performance of the system does not degrade when the shuttle valve is activated.

In addition to the above-described objects and advantages of the twin tower system of this invention, various other objects and advantages of the present invention will become more readily apparent to those persons who are skilled in the same and related arts from the following more detailed description of the invention, particularly, when such description is taken in conjunction with the attached drawing figures and the appended claims.

DETAILED DESCRIPTION OF A PREFERRED EMBODIMENT OF THE INVENTION

Before describing the present invention in detail, it is noted that for the sake of clarity and understanding, identical components having identical functions in each of the accompanying drawings have been marked with the same reference numerals throughout each of the several Figures illustrated herein.

Figure 1:
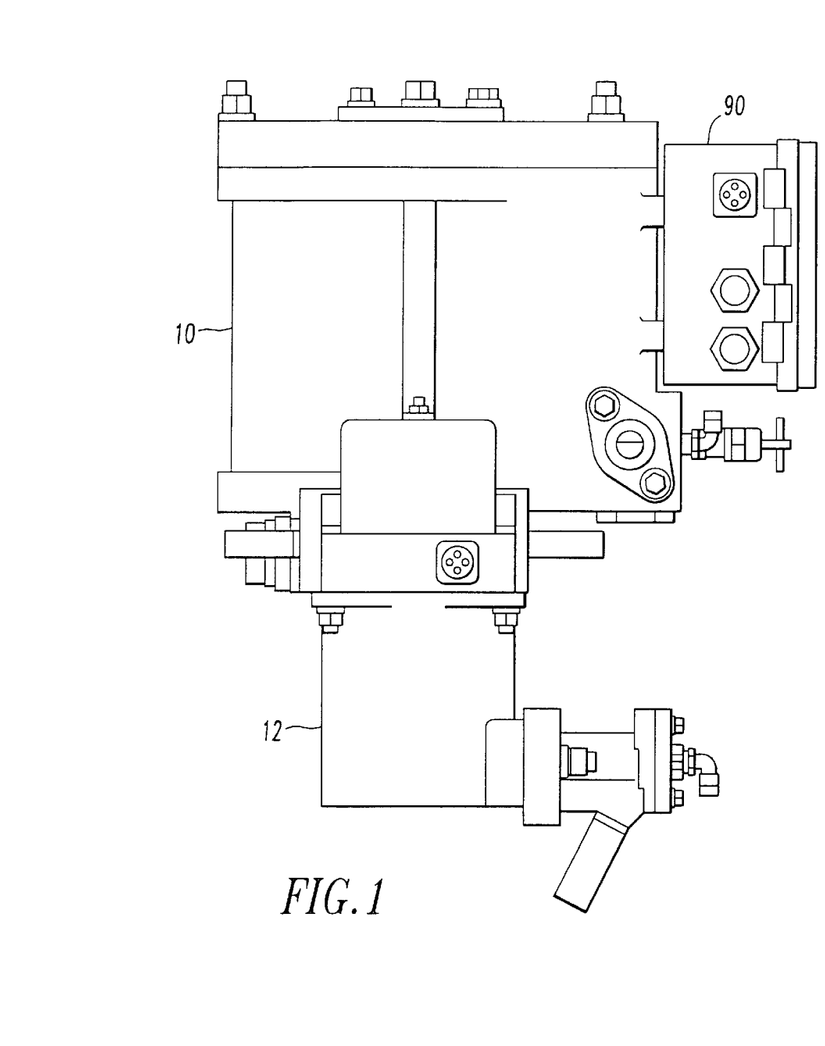
FIG. 1 is an elevational front view of a presently preferred embodiment of the apparatus for carrying out the twin tower air cleaning and drying system of this invention.
Figure 2:
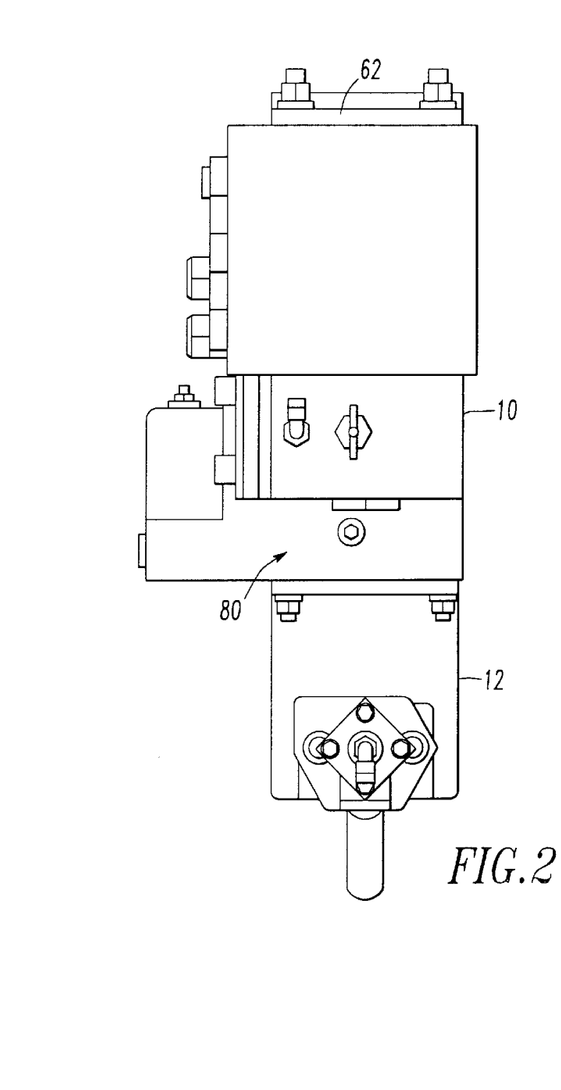
FIG. 2 a is side view of the apparatus shown in FIG. 1, with a partial section taken through a control valve.

Reference to FIGS. 1 and 2 will illustrate a presently preferred embodiment of the new and improved twin tower, compressed air filtering and drying system. Although the system as disclosed could be utilized for separating other liquid phases from other gaseous phases, the description below will address the separation of water from compressed air, particularly as utilized in a twin tower air cleaning system for a railway train. Like the prior art twin tower air cleaning system, this inventive system is designed to clean and dry a stream of unpurified pressurized air received from a source of compressed air such as an air compressor so as to supply a pneumatic system with purified dry air. The unpurified compressed air from a conventional air compressor typically contain the vapor of various substances as well as moisture in the form of water or other liquids such as various oils. For the sake of brevity, the terms vapor and moisture are herein collectively referred to as "moisture." The unpurified air will also typically contain other particulates such as dirt, dust, pollen and various other contaminants.

Figure 3:
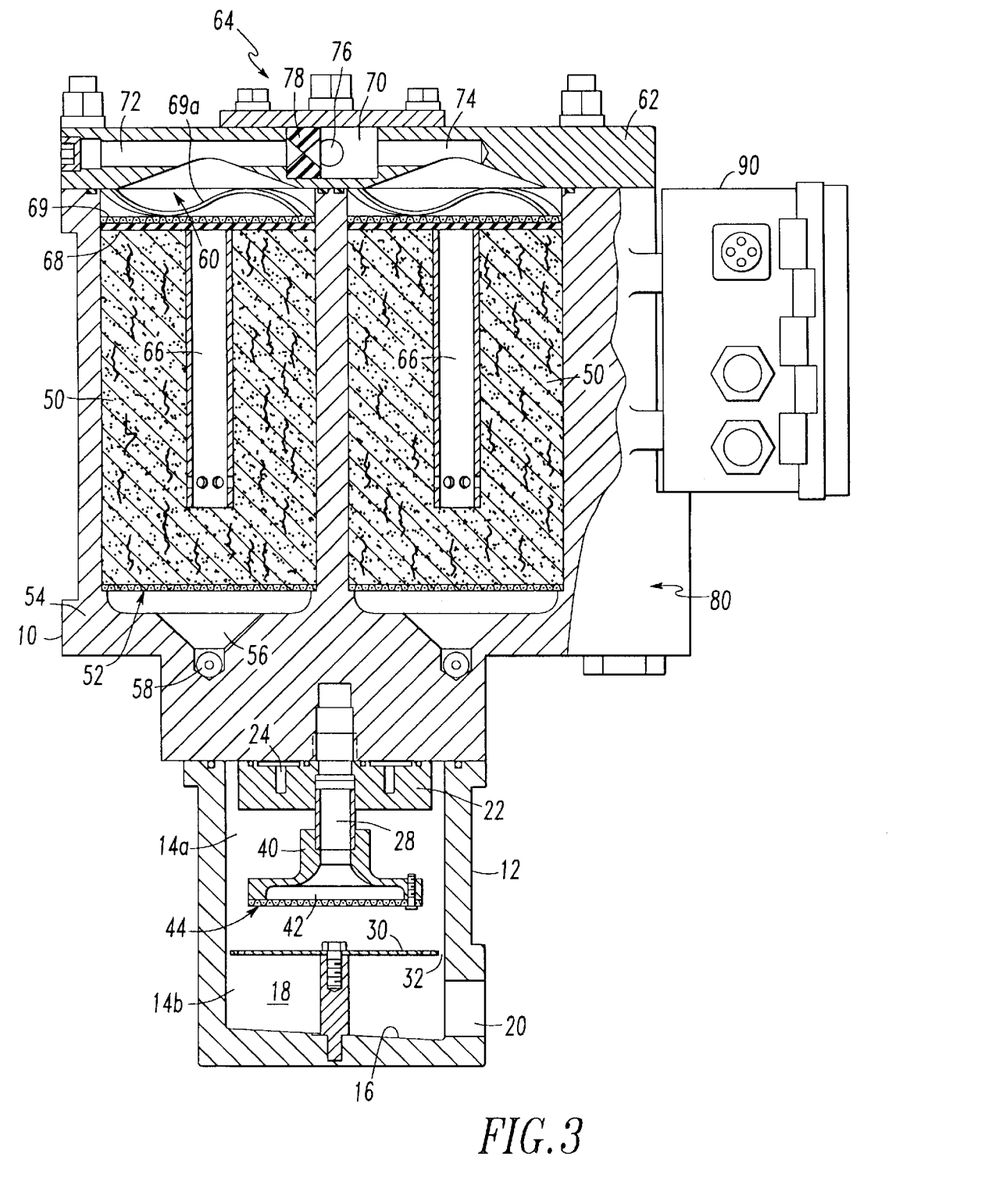
FIG. 3 is substantially the same as FIG. 1 except that it is a cross-sectional view taken through line III—III of FIG. 4.
Figure 4:
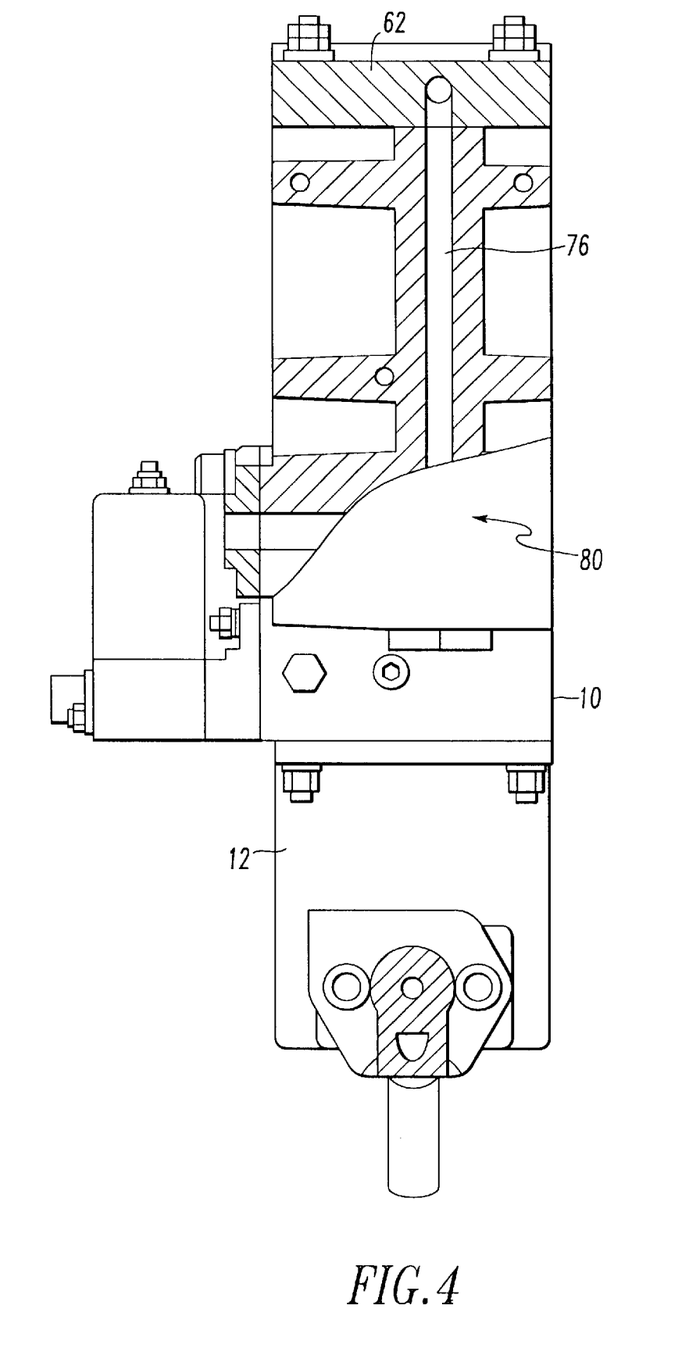
FIG. 4 is substantially the same as FIG. 2 except that it too is a cross-sectional view taken through line IV—IV FIG. 3.

With reference to the figures and particularly FIG. 3, the new and improved twin tower, air filtering and drying system comprises a system housing structure 10 to which is attached a centrifugal separator 12 having circular chamber 14 therein with a generally circular interior wall with a vertically disposed axis. The base of cylindrical chamber 14 is provided with a sloped floor 16, which in essence forms a floor of a sump 18 for collecting separated water after it is separated from the compressed air, and a valved drain outlet 20 for controllably draining collected water from the sump 18.

As further shown in FIG. 3, an inlet distributor 22 is provided with tangentially arranged inlets 24 for admitting the moist compressed air into chamber 14 such that the incoming moist air will be caused to cyclonically revolve within chamber 14 at a velocity sufficient to cause the water to condense and collect on the cylindrical interior wall of chamber 14 as a result of centrifugal forces, and as the concentration thereof increases, to flow downwardly along that interior wall as a result of gravitational forces, eventually collecting as a pool in the sump 18. The compressed air, on the other hand, having a lower mass than the water, will continue its cyclonic motion eventually concentrating at the axial center of chamber 14 when it is relatively dry. An air vent 28 axially disposed through the lower end of housing structure 10 is provided for permitting the compressed air to exit from chamber 14 after a major portion of the water therein has been removed.

A baffle or separator disk 30 is horizontally disposed within chamber 14 having a generally circular edge spaced from the interior wall of chamber 14 sufficiently to generally separate chamber 14 into an upper sub-chamber 14a and a lower sub-chamber 14b, but insufficient to prevent downward flow of centrifugally separated water collected on the interior wall of chamber 14 so that the water can flow downwardly along the interior wall from upper sub-chamber 14a and into the lower sub-chamber 14b through a space 32 provided around baffle 30 between the edge of the baffle 30 and the circular surface of the wall forming chamber 14.

Air vent 28 is preferably provided with an air scoop 40 generally having the shape of an inverted funnel with a large, oversized opening 42 at the bottom through which the de-watered air is admitted from the axial center of chamber 14a and passed-on to air vent 28. A filter element such as a screen 44 is attached under the opening 42 to filter-out particulate matter. The oversized nature of opening 42 and filter element 44 will minimize the possibility of filter element 44 becoming clogged with particulate matter sufficient to prevent adequate exit of the de-watered air.

A pair of desiccant containing cavities 50 are provided in housing structure 10 in a side-by-side relationship, preferably having a cylindrical form and essentially identical. Each cavity 50 is provided with a circular, porous support member 52, such as a screen or the like, resting on a circular protruding flange 54 near the bottom of the cavity 50, thereby providing an inlet chamber 56 in the lower portion of the cavity under the support member 52. An inlet port 58 at the base of each inlet chamber 56 is connected to a control valve 80 through which compressed air emerging from a centrifugal separator 12 can be admitted into the bottom of the desiccant containing cavities 50 via one of the ports 58 and the inlet chamber 56 connected thereto. Compressed air from the centrifugal separator 12 is routed past two such control valves 80, each one capable of being opened to admit the compressed air into just one of the cavities 50, while the other control valve is closed so that the other cavity 50 will be in the desiccant purge cycle. The control valves 80 are preferably air or solenoid operated cylinder having axial seals adapted to open in one direction for the purpose of admitting moist air from the centrifugal separator 12 into the associated cavity So for operating that cavity in the air drying cycle, and closing in the opposite direction to vent purge air from the associated cavity 50 while operating in the desiccant purge cycle.

The desiccant for the desiccant containing cavities 50 is preferably disposed within a cartridge or bag and supported on top of porous support member 52. The top of each chamber 50 is provided with an outlet chamber 60 above the upper surface of desiccant containing cartridge. Outlet chambers 60 are formed in part by the undersurface of a cover member 62 attached over the two cavities 50, with the cover member 62 also including a shuttle valve mechanism 64, adapted to pass the dried compressed air emerging from that cavity 50 (the one functioning in the air drying cycle) to the system for further use. At the same time, the shuttle valve mechanism 64 will permit a small portion of the dried compressed air to be admitted into the top of the other cavity 50 via its outlet chamber 60 so that this limited volume of dry compressed air will move downwardly through that other cavity 50 and the desiccant therein for effecting the desiccant purge cycle within that other chamber 50. Accordingly, the air from the centrifugal separator 12 is passed upwardly through just one of the desiccant containing chambers 50 via one of the control valves 80 which is opened for that purpose to effect the air cleaning and drying cycle within that one desiccant containing chamber 50. Concurrently, the shuttle valve mechanism 64 will direct a portion of dried air exiting from that one chamber 50 to the top of other chamber 50 for effecting the desiccant purge cycle whereby the dried air passes downwardly through that other chamber 50 to remove moisture from the desiccant therein. The other of the two control valves 80 will then exhaust that recycled air containing the reabsorbed moisture to atmosphere. A timer 90 is provided to periodically change the two control valves 80 so that the two cycles are reversed at periodic intervals. While such reversal time is not particularly critical, a 30 second time span has been deemed as ideal, so that each tower will remove moisture for 30 seconds followed by 30 seconds of desiccant purge operation.

One each desiccant cartridge is inserted within the two cavities 50, each resting upon a porous support member 52 and as necessary to providing an outlet chamber 60 within the cavity 50 above the cartridge. Accordingly, each chamber 50 is adapted to function in the air drying cycle whereby the air to be dried is admitted into inlet chamber 56, pass upwardly through the desiccant media and exit via outlet chamber 60.

A purge tube 66 is disposed within the desiccant media in each cavity 50 aligned in the direction of air flow therethrough such that the top of purge tube 66 is level with the upper surface of the desiccant media and thus open to outlet chamber 60. The lower end of the purge tube 66 is spaced approximately ⅔ of the distance downward from the upper surface of the desiccant media with the base thereof spaced upwardly from porous support member 52. Accordingly, purge tube 66 should preferably extend vertically through the upper ⅔ portion of the desiccant media with its upper end open to the outlet chamber 60 and its lower end open to the mass of desiccant media and spaced the remaining ⅓ distance above the base or porous support member 52.

A circular disk shaped flapper valve 68 having a diameter to match that of the desiccant containing cavity 50, is disposed onto the upper surface of each desiccant containing cartridge or bag therein. The flapper valve 68, preferably made of sheet rubber, is adapted to overlay and cover the annular, porous upper surface of desiccant containing cartridge or bag, as well as overlay the upper opening into purge tube 66. Flapper valve 68 is further provided with a plurality of diametric slots or cuts intersecting at the axis of the circular form, so that a plurality of pie-shaped portions of the flapper valve 68 point to each other across the axis, with the outer ends of pie-shaped portions joined together at the circular perimeter of flapper valve 68. Accordingly, the pie-shaped portions are adapted to deflect inwardly or outwardly at the axis of flapper valve 68, while the base ends thereof at the perimeter of flapper valve 68 do not deflect. A circular screen member 69 is disposed on top of flapper valve 68, while a circular wave spring 69*a* is disposed thereover.

The shuttle valve mechanism 64 is firstly intended to distribute the filtered and dried compressed air emerging from the desiccant containing cavity chamber 50 (i.e., that cavity 50 which is operating in the air filtering and drying cycle) in an output percentage to the pneumatic system for its intended use, and secondly intended to direct a purge percentage of that filtered and dried air back into the twin tower system (i.e., that cavity 50 which is operating in the desiccant purge cycle). The purge percentage of the cleaned and dried air is used to purge the desiccant media therein of moisture it has previously collected. As shown, the underside of cover member 62 is provided with a pair of side-by-side conical recesses machined into the undersurface, each sufficient to form the outlet chamber 60 over the respective cavities 50 thereunder. A rectangular chamber 70 is horizontally disposed within cover member 62 at the approximate center thereof, with a first passageway 72 within the cover member 62 interconnecting the apex of a first of the conical recesses forming a first outlet 60 with a first end of the rectangular chamber 70, and a second passageway 74 within the cover member 62 interconnecting the apex of a second conical recess forming a second outlet 60 with a second end of the rectangular chamber 70. Accordingly, one each of the desiccant containing cavities 50 is in communication with rectangular chamber 70 via one of the passageways 72 or 74. An outlet port 76 is also provided within the cover member 62 extending outwardly from the rectangular chamber 70 from a point intermediate the first and second ends thereof, namely intermediate the two passageways 72 and 74. The outlet port 76 is the primary outlet for the filtered and dried compressed air delivered from the cleaning and drying system to the compressed air system for use as intended thereby.

A valve member 78, preferably having a cubic form, is reciprocally disposed within the chamber 70, also preferably having a mating square cross-section, and intended for movement from one extreme end of chamber 70 to the other. Therefore, reciprocating valve member 78 is adapted to open the first passageway 72 (and accordingly a first of the cavities 50) to the outlet port 76 when the valve member 78 is disposed at the second end of the rectangular chamber 70, and conversely adapted to open the second passageway 74 (and accordingly the second of the cavities 50) to the outlet port 76 when the valve member 78 is disposed at the other or first end of the rectangular chamber 70. As should be apparent, the reciprocating valve member 78 is adapted to reciprocate back and forth within chamber 70 in response to the pressure and flow of the air emerging from whichever cavity 50 is operating in the air drying cycle. Therefore, when the left cavity 50 is functioning in the air filtering and drying cycle, the air flow therethrough will force valve member 78 to the right, opening passageway 72 to passageway 76 to thereby deliver the filtered and dried air to the pneumatic system for use as intended. When the right cavity 50 becomes the cavity functioning in the air filtering and drying cycle, the change in air flow therethrough, will force the valve member 78 to the left, thereby closing passageway 72, and instead opening passageway 74 to passageway 76.

A by-pass port (not shown) is provided through the body of reciprocating valve member 78 which is adapted to permit a limited amount of compressed air to pass into the cavity 50 which is not functioning in the air filtering and drying cycle; namely, to pass from the first passageway 72 into the second passageway 74 when the first passageway 72 is open to the outlet port 76; and which also serves the reverse situation, namely to permit a limited amount of compressed air to pass into the first passageway 72 from the second passageway 74 when the second passageway 74 is open to the outlet port 76. Accordingly, reciprocating valve member 78 will reciprocate back and forth within rectangular chamber 70 opening one passageway, either passageway 72 or 74, to the outlet port 76 to deliver the filtered and dried compressed air to the system in the output percentage for use as intended, while at the same time permitting a purge percentage of the filtered and dried air to by-pass the reciprocating valve member 78 via the by-pass port (not shown) to be directed into the other of the two cavities 50 for the purpose of effecting the purge cycle within that other chamber 50.

In operation, compressed air from a conventional compressor (not shown) and preferably cooled within 10 degrees F. of the ambient temperature, is admitted into centrifugal separator 12 via the inlets 24 which are perpendicular to the radius and disposed at 90 degrees intervals so that the air enters chamber 14a tangentially causing a cyclonic, rotating motion of the compressed air within chamber 14. As is known, centrifugal forces resulting from the cyclonic motion will cause the heavier molecules; i.e., water molecules to be forced to the outer perimeter of the rotating air, while the lighter, de-watered air is forced inwardly towards the axis of rotation. The centrifugal forces acting on the water molecules will cause the water molecules to condense on the circular wall of chamber 14, and the gravitational fores will, in turn, cause the water to flow downwardly along the interior surface of that wall, eventually being collected in a pool in sump 18. Because of the space 32, baffle 30 will not prevent such downward movement of the water to sump 18. At the same time, the de-watered air concentrated at the axis of rotation; i.e., axis of chamber 14, will be forced to exit via air scoop 40 and out of the separator via air vent 28. Accordingly the volume and rate of de-watered air exiting via air vent 28 will be equal to the volume and rate of compressed air entering the separator via inlets 24.

At periodic intervals, as the water level in sump 18 reaches a predetermined fill level, the separated water is drained from sump 18 via drain outlet 20 by appropriately opening drain outlet 20. Normally, when such a drain valve is opened, the compressed air within chamber 18 will not only readily force water in sump 18 to exit via drain outlet 20, but a significant pressure differential is created within chamber 14 as will cause considerable air turbulence within chamber 14. In fact, such a turbulence is normally so significant that water in sump 18, as well as water flowing downwardly on the wall of chamber 14, is agitated to an extent that its surface tension is considerably broken thereby causing a significant amount of water to be redissolved into the de-watered air from which it had just been removed. Accordingly, the turbulent action resulting from opening drain outlet 20 tends to significantly defeat the de-watering effect being sought by the centrifugal separation. However, the presence of baffle 30 tends to significantly concentrate to the cyclonic air movement, as well as the turbulent air movement resulting from an open drain outlet 20, within the upper sub-chamber 14a, with the result that there is only minor turbulent air movement within the lower sub-chamber 14b which is not significant enough to cause major amounts of the collected water to redissolve in the de-watered air.

From the centrifugal separator 12, the compressed air may be still rather moist and is routed past the two control valves 80, only one of which will be open to permit the compressed air through via one of the inlet ports 58 into the associated inlet chamber 56 and from there is allowed to pass upwardly through the desiccant media within the associated cavity 50, and the desiccant media will of course function to remove moisture from the compressed air. Due to the upward flow forces, the flapper valve 68 will attempt to deflect the flow of compressed air, but cannot because the screen member 69 thereover is in the way, preventing any significant deflection of pie-shaped portions of flapper valve 68. Accordingly, the shape of flapper valve 68, reaming substantially flat, thereby restricting the flow of compressed air upward through purge tube 66, so that the greater mass of compressed air is forced to pass through the desiccant media within cavity 50, whereby the desiccant media therein will function as intended to remove moisture therefrom. As should be apparent, the upward flow of compressed air will readily flow into outlet chamber 60 as the pressure thereof will be able to lift and deform flapper valve 68, at least to the extent necessary to get therepast. While flapper valve 68 will not function to prevent the flow of any compressed air upwardly through purge tube 66, the relatively flat nature thereof as maintained by the screen member thereover will restrict and limit such upward flow through purge tube 66 from what might otherwise be normal, so that in essence a majority of the compressed air is caused to flow upwardly through the desiccant media. The wave spring 69a will function to keep flapper valve 68 biased against the upper surface of desiccant containing cartridge and to help maintain the flat shape of the flapper valve 68.

When either of the cavities 50 are functioning in the desiccant purge cycle, however, the flow of compressed air therethrough is in the reverse direction, so that the dry, purge air is admitted into outlet chamber 60 (which now becomes an inlet chamber). From there, the dry air is forced downwardly through the desiccant media to remove moisture therefrom. This directional flow will cause an increase in pressure within outlet cavity 60 thereby biasing flapper valve 68 downward against the upper surface of desiccant containing cartridge which blocks much of that dry air from entering directly into the desiccant media through the porous upper surface. The downward flow of compressed, dry air within outlet chamber 60, however, will force the pie shaped portions of flapper valve 68 to be deflected into the upper open end of purge tube 66, so that the great majority of the compressed, dry air, instead of entering directly into the desiccant containing cartridge through the porous upper surface, will enter into purge tube 66 and move downwardly therethrough. Therefore, this mass of compressed, dry air will not enter directly into the mass of desiccant media except as it exits the lower end of purge tube 66 where the moisture content of the desiccant media is concentrated. Clearly, the flapper valve 68 does not provide an air-tight seal to the reverse flow of compressed, dry air, as air can by-pass the flapper valve 68 through the slots and around the peripheral edge. Nevertheless, flapper valve 68 will function to direct a significant majority of the reverse flowing dry air downwardly through the purge tube 66, as opposed to through the upper mass of desiccant media to thereby promote and commence moisture removal from the desiccant media at a location approximately $\frac{2}{3}$ of the distance downwardly from the upper surface of the desiccant media, where the water content is concentrated. During the air drying cycle, on the other hand, when the compressed, moist air is moving upwardly, hopefully through the desiccant media so that the desiccant media will extract moisture therefrom, flapper valve 68 again does not form an air tight seal, but by maintaining its relatively flat configuration, it does restrict the upward flow of compressed air through the purge tube 66, so that at least a majority of it will pass upwardly through the desiccant media.

The upward flowing compressed air through a first of the cavities 50 (assuming it to be the left cavity) will of course pass into the outlet chamber 60 over that first (left) desiccant containing cavity 50, and into the first passageway 72 in the cover member 62, causing reciprocating valve member 78 to reciprocate away from that first passageway 72, closing passageway 44, so that most of the filtered and dried compressed air will exit via outlet port 76 from which it is delivered to the pneumatic system for use as intended. A small purge percentage of the filtered and dried, compressed air, however, will by-pass the reciprocating valve member 78 entering through the by-pass port (not shown), so that it will enter second passageway 74 and be conveyed downwardly through the other (i.e., right) cavity 56. As previously explained, this purge percentage of dried, compressed air will purge the moisture contained the desiccant in that cavity 50 (i.e., right cavity 50), and upon exiting from the bottom, the control valve 80 for that cavity 56 will vent the purge air to atmosphere.

After a preset period of time, the timer 90 will switch the open and closed positions of the two control valves 80, so that the moist, compressed air from the centrifugal separator 12 is switched-over to pass upwardly through the second of the two cavities 50 (i.e., the right cavity) where it is filtered and dried in this second (right) cavity. The upward flowing compressed air through the second (right) cavity 50 will of course pass into the outlet chamber 60 over that second desiccant containing cavity 50, and into the second passageway 74 causing reciprocating valve member 78 to reciprocate to the other end of chamber 70 away from that second passageway 74, thereby closing passageway 72, so that most of the dried, compressed air will exit through passageway 74 via outlet port 76 from which it is delivered to the pneumatic system for use as intended. As before, a small purge percentage of the dried, compressed air, however, will by-pass the reciprocating valve member 78 entering through the by-pass port, so that it will enter first passageway 72 and conveyed downwardly through the first (i.e., left) cavity. This purge percentage of dried, compressed air will of course serve to purge the moisture contained the desiccant in that cavity, and upon exiting from the bottom, the control valve 80 for that cavity will vent the purge air to atmosphere. Accordingly, the switching of reciprocating valve member 78 occurs automatically as the flow of compressed air is switched from one cavity 50 to the other.

Having disclosed a preferred embodiment of the new and improved twin tower air cleaning and drying process of this invention, it should be apparent that a number of different embodiments and modifications could be devised and incorporated without departing from the spirit of the invention. For example, centrifugal separators and control valves of other designs could be substituted for those as described above, and other types of one-way valves such as a floating ball valve could be substituted for the flapper valve as described above. In addition, the shuttle valve mechanism could be provided in a number of differing designs which could be substituted for those described above.

We claim:

1. A twin tower gas drying system for cleaning and drying a stream of unpurified pressurized gas received from a source thereof for use by a pneumatic system, said gas drying system comprising:
   (A) a separator defining a centrifugal chamber for initially centrifugally separating moisture and other particulates from such stream of unpurified gas, said centrifugal chamber having;
      (a) a baffle horizontally disposed therein to generally separate said centrifugal chamber into an upper sub-chamber and a lower sub-chamber but insufficient to prevent downward flow of centrifugally collected liquid along interior walls of said centrifugal chamber from said upper sub-chamber into said lower sub-chamber;
      (b) a sump for collecting said centrifugally separated liquid at the bottom of said centrifugal chamber; and
      (c) a drain for periodically draining said centrifugally separated liquid from said sump;
   (B) a pair of cavities each containing desiccant media, said cavities further including;
      (a) a purge tube extending vertically within said desiccant media from an upper surface of said desiccant media to a level approximately ⅔ of the distance downward from said upper surface to a bottom of said desiccant media
      (c) a flapper valve disposed over said desiccant media and said purge tube adapted to close and restrict flow of gas through said purge tube when said gas is flowing upwardly through said cavity, and further adapted to open and promote gas flow through said purge tube when said gas is flowing downwardly through said cavity;
   (C) a first control valve connected to a first of said cavities adapted to be either in an open condition or a closed condition, whereby in said open condition said control valve will deliver a stream of unpurified gas from said separator to said first of said cavities, and in said closed condition will open said first cavity to atmosphere;
   (D) a second control valve connected to a second of said cavities adapted to be either in an open condition or a closed condition, whereby in said open condition said control valve will deliver a stream of unpurified gas from said separator to said second of said cavities, and in said closed condition will open said second cavity to atmosphere;
   (E) a timer control for alternately and periodically opening and closing said first and second control valves such that as said first valve is in said opened condition said second valve is in said closed condition, with said first cavity functioning in a gas filtering and drying mode with the unpurified gas passing through said desiccant media within said first cavity, and visa versa;
   (F) a shuttle valve for admitting an output percentage of filtered and dried gas emerging from said first cavity to a storage chamber when said first control valve is in said open condition, and alternately for admitting an output percentage of filtered and dried gas emerging from said second cavity to said storage chamber when said second control valve is in said open condition, said shuttle valve further having a by-pass means adapted to permit a purge percentage of the filtered and dried gas to be admitted into said second cavity when said first valve is in said open condition and alternately adapted to permit a purge percentage of the filtered and dried gas to be admitted into said first cavity when said second valve is in said open condition.

2. A twin tower gas drying system for cleaning and drying a stream of unpurified pressurized gas, according to claim 1, in which each said first and second control valves are adapted, when closed, to vent said cavities to atmosphere.

3. A twin tower gas drying system for cleaning and drying a stream of unpurified pressurized gas, according to claim 1, in said gas drying system actuates said drain valve periodically and at any time such source of pressurized gas ceases supplying such stream of unpurified gas.

4. A twin tower gas drying system for cleaning and drying a stream of unpurified pressurized gas, according to claim 1, including a heater element for said drain valve so as to prevent during cold temperature operation freezing of such fluid and of such other particulates collected within said sump thereby preventing clogging of said drain valve therewith.

5. A twin tower gas drying system for cleaning and drying a stream of unpurified pressurized gas, according to claim 1, including a drain exhaust silencer to reduce noise associated with operation of said drain valve.

6. A twin tower gas drying system for cleaning and drying a stream of unpurified pressurized gas, according to claim 1, in which said purge tube is provided with a plurality of apertures through a wall thereof adjacent to a lower end of said purge tube.

7. A twin tower gas drying system for cleaning and drying a stream of unpurified pressurized gas, according to claim 6, in which said flapper valve means comprises a flat rubber flapper valve and is generally circular in form having a plurality of diametric cuts therethrough intersecting at an axis of said circular form to provide a plurality of pie-shaped portion joined at the periphery of said valve, said plurality of pie-shaped portions adapted to be deflected into said purge tube when gas is flowing downwardly through said desiccant media.

8. A twin tower gas drying system for cleaning and drying a stream of unpurified pressurized gas, according to claim 7, further including a screen member disposed over said flat rubber flapper valve adapted to maintain the generally flat configuration of said flapper valve and restrict the flow of gas through said purge tube when gas is flowing in said gas drying cycle.

9. A twin tower gas drying system for cleaning and drying a stream of unpurified pressurized gas, according to claim 8, further including a wave spring disposed over said screen member adapted to generally maintain said flapper valve and said screen member biased against said upper porous wall member.

10. A twin tower gas drying system for cleaning and drying a stream of unpurified pressurized gas, according to claim 1, in which said shuttle valve includes;
   a) a generally rectangular cover member adapted to be attached over the desiccant containing chambers to form a closure thereover;
   b) a horizontally disposed interconnecting chamber within said cover member;
   c) a first passageway within said cover member interconnecting a first of the desiccant containing chambers with a first end of said interconnecting chamber;
   d) a second passageway within said cover member interconnecting a second of the desiccant containing chambers with a second end of said interconnecting chamber;
   e) an outlet port within said cover member extending outwardly from said interconnecting chamber at a point intermediate said first end thereof and said second end thereof;
   f) a reciprocal valve member reciprocally disposed within said interconnecting chamber adapted to open said first passageway to said outlet port when said valve member is disposed at said second end of said interconnecting chamber, and adapted to open said second passageway to said outlet port when said valve member is disposed at said first end of said interconnecting chamber; and
   g) a by-pass port within with said reciprocal valve member adapted to permit a limited amount of compressed air to pass from said first passageway into said second passageway when said first passageway is open to said outlet port and to permit a limited amount of compressed air to pass into said first passageway from said second passageway when said second passageway is open to said outlet port.

11. A twin tower gas drying system for cleaning and drying a stream of unpurified pressurized gas, according to claim 10, in which said interconnecting chamber is generally centered within said cover member.

12. A twin tower gas drying system for cleaning and drying a stream of unpurified pressurized gas, according to claim 11, in which an undersurface said cover member is provided with a pair of conical recesses, each adapted to form an upper closure over each of the desiccant containing chambers.

13. A twin tower gas drying system for cleaning and drying a stream of unpurified pressurized gas, according to claim 12, in which each of said first and second passageway comprises a horizontal aperture extending from an end of said interconnecting chamber, each communicating with an apex of one of said conical recesses.

14. A twin tower gas drying system for cleaning and drying a stream of unpurified pressurized gas, according to claim 13, in which said by-pass port comprises a small aperture extending between opposite side faces of said reciprocating valve member.

15. A twin tower gas drying system for cleaning and drying a stream of unpurified pressurized gas, according to claim 14, in which said reciprocating valve member has a first side face oriented towards said first passageway and a second side face oriented towards said second passageway, and an O-ring seal disposed in each of said first side face and said second side face, each said O-ring seal adapted to abut against an end wall of said interconnecting chamber, a first of said O-ring seals adapted to close and seal said first passageway from said outlet port when said second passageway is open to said outlet port, a second of said O-ring seals adapted to close and seal said second passageway from said outlet port when said first passageway is open to said outlet port.

16. A twin tower gas drying system for cleaning and drying a stream of unpurified pressurized gas, according to claim 15, in which said reciprocating valve member is generally cubical in form.

17. A twin tower gas drying system for cleaning and drying a stream of unpurified pressurized gas, according to claim 16, in which a conical recess is provided in each of said first side face and said second side face centrally disposed within each of said O-ring seals, and said small aperture interconnects said conical recesses at apexes thereof.

18. A twin tower gas drying system for cleaning and drying a stream of unpurified pressurized gas, according to claim 17, in which said interconnecting chamber is formed by providing a rectangular channel within an upper surface of said rectangular body member and attaching a cover plate thereover to close said rectangular channel and form said interconnecting chamber.

\* \* \* \* \*